(12) United States Patent
Ng

(10) Patent No.: US 12,094,387 B2
(45) Date of Patent: Sep. 17, 2024

(54) OFFSET DRIVE SCHEME FOR DIGITAL DISPLAY

(71) Applicant: OmniVision Technologies, Inc., Santa Clara, CA (US)

(72) Inventor: Sunny Yat-san Ng, San Jose, CA (US)

(73) Assignee: OmniVision Technologies, Inc., Santa Clara, CA (US)

(*) Notice: Subject to any disclaimer, the term of this patent is extended or adjusted under 35 U.S.C. 154(b) by 120 days.

(21) Appl. No.: 17/824,723

(22) Filed: May 25, 2022

(65) Prior Publication Data

US 2023/0386386 A1    Nov. 30, 2023

(51) Int. Cl.
*G09G 3/20*    (2006.01)
*G06T 1/60*    (2006.01)
*G09G 3/32*    (2016.01)

(52) U.S. Cl.
CPC ............. *G09G 3/2092* (2013.01); *G06T 1/60* (2013.01); *G09G 3/32* (2013.01); *G09G 2300/0452* (2013.01); *G09G 2310/08* (2013.01); *G09G 2320/0686* (2013.01); *G09G 2360/127* (2013.01)

(58) Field of Classification Search
CPC ............... G09G 3/2092; G09G 3/32; G09G 2300/0452; G09G 2310/08; G09G 2320/0686
See application file for complete search history.

(56) References Cited

U.S. PATENT DOCUMENTS

| 8,223,179 | B2 | 7/2012 | Kwan et al. | |
| 2006/0284904 | A1* | 12/2006 | Ng | G09G 3/2092 |
| | | | | 345/691 |
| 2014/0253614 | A1* | 9/2014 | Hudson | G09G 3/3685 |
| | | | | 345/698 |
| 2023/0027570 | A1* | 1/2023 | Li | G09G 3/3674 |

\* cited by examiner

*Primary Examiner* — Sing-Wai Wu
(74) *Attorney, Agent, or Firm* — Larry E. Henneman, Jr.; Henneman & Associates, PLC

(57) ABSTRACT

A novel method for driving a digital display having a plurality of pixel rows includes receiving a frame of data to be written to the display in a predetermined frame time, dividing the frame time into a plurality of time intervals, defining a plurality of row groups, and defining a unique sequence for each row group to display corresponding multi-bit data words and a number of off states on the pixels of the rows of the row groups. The drive sequence of each row is offset with respect to an initial row by a unique predetermined number of off states. The predetermined numbers of off states ensure that the pixel updates of the groups do not overlap.

20 Claims, 10 Drawing Sheets

| Row Group # | Offset | PWM Binary Sequence Write Times | | | | | | | | | | |
|---|---|---|---|---|---|---|---|---|---|---|---|---|
| | | 0 | 1 | 2 | 4 | 8 | 16 | 32 | 64 | 128 | 256 | 512 | 1024 |
| 1 | 0 | 0 | 1 | 2 | 4 | 8 | 16 | 32 | 64 | 128 | 256 | 512 | 1024 |
| 2 | 5 | 5 | 6 | 7 | 9 | 13 | 21 | 37 | 69 | 133 | 261 | 517 | 1029 |
| 3 | 10 | 10 | 11 | 12 | 14 | 18 | 26 | 42 | 74 | 138 | 266 | 522 | 1034 |
| 4 | 23 | 23 | 24 | 25 | 27 | 31 | 39 | 55 | 87 | 151 | 279 | 535 | 1047 |
| 5 | 43 | 43 | 44 | 45 | 47 | 51 | 59 | 75 | 107 | 171 | 299 | 555 | 1067 |
| 6 | 52 | 52 | 53 | 54 | 56 | 60 | 68 | 84 | 116 | 180 | 308 | 564 | 1076 |
| 7 | 77 | 77 | 78 | 79 | 81 | 85 | 93 | 109 | 141 | 205 | 333 | 589 | 1101 |
| 8 | 88 | 88 | 89 | 90 | 92 | 96 | 104 | 120 | 152 | 216 | 344 | 600 | 1112 |

| Offset | # Of Row Groups | OPTICAL EFFICIENCY ||
|---|---|---|---|
| | | 8-BIT SYSTEM | 10-BIT SYSTEM |
| 0 | 1 | 100.00% | 100.00% |
| 5 | 2 | 98.08% | 99.51% |
| 10 | 3 | 96.23% | 99.03% |
| 23 | 4 | 91.71% | 97.80% |
| 43 | 5 | 85.57% | 95.97% |
| 52 | 6 | 83.06% | 95.16% |
| 77 | 7 | 76.81% | 93.00% |
| 88 | 8 | 74.34% | 92.01% |

FIG. 9

OFFSET DRIVE SCHEME FOR DIGITAL DISPLAY

BACKGROUND OF THE INVENTION

Field of the Invention

This invention relates generally to digital displays, and more particularly to pixel drive systems and methods for digital displays.

Description of the Background Art

As digital displays (e.g., liquid crystal on silicon displays, micro light emitting diode displays, etc.) are being incorporated into more and more devices, there is a constant need to improve their performance. A typical digital display includes drive circuitry that is electrically connected to an m×n array of pixels arranged into a plurality of m columns and n rows. Each row of pixels is electrically connected to a respective row select line, and each column of pixels is electrically connected to respective data line set. When a signal is asserted on a particular row select line, each pixel in that row will latch the data that is asserted on the respective data line(s) to which it is connected. For a single frame, the data is provided on the data lines and the row select lines are actuated in a predetermined order, so that each bit of data is displayed by its intended pixel for an amount of time corresponding to its bit-weight. As a result, each pixel will display an intensity corresponding to the intensity value of an associated multi-bit data word.

The least significant bit (LSB) time is the amount of time that the LSB of the data is displayed by a pixel. Shorter LSB times enable increased frame rate (reduces visible artifacts), increased bit-depth (greater intensity precision), and increased display resolution (e.g., more display rows). However, it takes a finite amount of time to load a single bit into a row of pixels, which depends on the speed of the circuitry. Therefore, there is a limitation with respect to how short the LSB time can be.

SUMMARY

The present invention overcomes the problems associated with the prior art by providing a display and a display driving scheme relaxes the time constraints imposed by the duration of assertion of a least significant bit (LSB) of the data on the display. The invention facilitates greater precision of intensity values (e.g., the use of shorter least significant bit times). The invention also facilitates the use of slower, and therefore less expensive, circuitry for displaying data.

Example methods for driving a digital display including a plurality of pixels arranged in a plurality of rows are disclosed. One example method includes receiving a frame of data. The frame of data is intended to be written to the digital display during a predefined frame time. The frame of data can include one multi-bit data word corresponding to each pixel of the display, and each multi-bit data word can include a plurality of individual bits. Each bit can have a weight corresponding to an amount of time that the bit should be displayed by the corresponding pixel, and each multi-bit data word can be capable of defining a maximum number of different intensity values. The example method additionally includes dividing the frame time into a total number of time intervals, and the total number of time intervals can be greater than the maximum number of different intensity values. The example method additionally includes defining a first set of the rows of the display and defining a second set of the rows of the display. The example method also includes defining a first sequence for displaying the corresponding multi-bit data words and one or more off states by the rows of the first set of rows, and defining a second sequence for displaying the corresponding multi-bit data words and one or more off states on the rows of the second set of rows. The first sequence can begin with the display of bits of the multi-bit data words, and the second sequence can begin with the display of an initial off state. The first sequence and the second sequence can begin during a same time interval of the number of time intervals. The example method additionally includes displaying the frame of data and the off states on the display according to the first sequence and the second sequence.

In a particular example method, the multi-bit data words can be binary weighted data words, and a duration of the initial off state of the second sequence can be equal to 5, 10, 23, 43, 52, 77, or 88 of the time intervals. In a particularly efficient example method, the duration of the initial off state of the second sequence is equal to 5 of the time intervals.

In an example method, the first sequence can include loading data into the pixels of the first set of rows during a first set of the time intervals. The second sequence can include loading data into the pixels of the second set of rows during a second set of the time intervals. The first set of the time intervals and the second set of the time intervals can be mutually exclusive.

In an example method, the first sequence can include sequentially loading the data bits of the multi-bit data words into the pixels in descending order of bit significance, loading an off state into the pixels, and then reloading the bits of the multi-bit data words into the pixels in ascending order of bit significance. The second sequence can include sequentially loading a first off state into the pixels, loading the data bits of the multi-bit data words into the pixels in descending order of bit significance, reloading the bits of the multi-bit data words into the pixels in ascending order of bit significance, and then loading a second off state into the pixels. The duration of the off state in the first sequence can be equal to a sum of the durations of the first off state and the second off state of the second sequence.

In an example method, the first sequence can include a first bit that is displayed for a first time period. The second sequence can include a second bit that is displayed during at least a part of the first time period, and the second sequence can include a third bit that is displayed during at least a part of the first time period. The second sequence can also include a fourth bit that is displayed during at least a part of the first time period. The third bit can be displayed for a second time period. The second time period can start after the first time period begins, and the second time period can end before the first time period ends.

In example methods, the number of time intervals during which off states are asserted on the pixels of the first set of rows during the first sequence can be the same as the number of time intervals during which off states are asserted on the pixels of the second set of rows during the second sequence.

Example methods can additionally include defining one or more additional sets of the rows of the display, and asserting off states on the pixels of the rows of each set of rows for the same number of the time intervals. Determining the same number of time intervals can be based on a total number of sets of rows that are defined. For example, when exactly three sets of rows are defined, the same number of time intervals during which off states are asserted is ten. When exactly four sets of rows are defined, the same number of time intervals during which off states are asserted is twenty-three. When exactly five sets of rows are defined, the same number of time intervals during which off states are asserted is forty-three. When exactly six sets of rows are defined, the same number of time intervals during which off states are asserted is fifty-two. When exactly seven sets of rows are defined, the same number of time intervals during which off states are asserted is seventy-seven. When exactly eight sets of rows are defined, the same number of time intervals during which off states are asserted is eighty-eight. In any of these or other example methods, during every one of the time intervals, data is written to no more than one set of rows.

Another example method for displaying data on a display including a plurality of pixels arranged in a plurality of rows. The example method includes receiving a frame of data to be written to the display during a predefined frame time. The frame of data can include one multi-bit data word corresponding to each pixel of the display. Each multi-bit data word can include a plurality of individual bits, each bit having a weight corresponding to an amount of time that the bit should be displayed by the corresponding pixel. Each multi-bit data word is capable of defining a maximum number of different intensity values. The example method additionally includes dividing the frame time into a total number of time intervals. The total number of time intervals can be greater than the maximum number of intensity values. The example method additionally includes defining a plurality of groups of the rows, and defining a different update sequence for each of the groups of the rows. Each of the update sequences defines the particular ones of the time intervals during which the pixels of the rows of an associated group will be updated with bits of the multi-bit data words and other ones of the time intervals during which the pixels of the rows of the associated group will be updated with off states. The example method additionally includes displaying the frame of data and the off states on the display according to the different update sequences. During each particular one of the time intervals, the updating of pixels can be limited to a single one of said groups of rows.

In an example method, a first update sequence associated with a first group of the rows can begin with the sequential assertion of the bits of the multi-bit data words. Each bit can be asserted for a number of the time intervals corresponding to a significance of the bit being asserted. The first update sequence can end with the assertion of off states for a predetermined number of the time intervals. The predetermined number of the time intervals can depend on the number of groups in the plurality of groups. A second update sequence associated with a second group of the rows can begin with the assertion of off states for the predetermined number of the time intervals and can end with the sequential assertion of the bits of the multi-bit data words. Each bit can be asserted for a number of the time intervals corresponding to a significance of the bit being asserted. A third update sequence associated with a third group of the rows can begin with the assertion of off states for an initial number of the time intervals, and proceeds to the sequential assertion of the bits of the multi-bit data words. Each bit can be asserted for a number of the time intervals corresponding to a significance of the bit being asserted. The third update sequence can end with the assertion of off states for a trailing number of the time intervals. A sum of the initial number of the off states and the trailing number of the off states can be equal to the predetermined number of the off states.

In example methods, an additional plurality of update sequences associated, respectively, with an additional plurality of groups of rows, can each begin with the assertion of off states for a unique initial number of the time intervals, and proceed to the sequential assertion of the bits of the multi-bit data words. Each bit can be asserted for a number of the time intervals corresponding to a significance of the bit being asserted. Each additional update sequence can end with the assertion of off states for a unique trailing number of the time intervals. For each update sequence of the additional plurality of update sequences a sum of the unique initial number of the time intervals and the unique trailing number of the time intervals is equal to the predetermined number of the off states.

An example display system includes a display, a frame buffer, configuration data, and a controller. The display has a plurality of pixels arranged in a plurality of rows. The frame buffer can be operative to receive a frame of data and to provide the data to the pixels of display responsive to control signals from the controller. The frame of data can include one multi-bit data word corresponding to each pixel of the display. Each multi-bit data word can include a plurality of individual bits, and each bit can have a weight corresponding to an amount of time that the bit should be displayed by the corresponding pixel. Each multi-bit data word can, therefore, be capable of defining a maximum number of different intensity values. The configuration data can define the frame time as a total number of time intervals. The total number of time intervals can be greater than the maximum number of different intensity values. The configuration data can also define a first set of the rows of the display and a second set of the rows of the display. The configuration data can also define a first sequence for displaying the corresponding multi-bit data words and one or more off states by the rows of the first set of rows. The first sequence can begin with the display of bits of the multi-bit data words. The configuration data can also define a second sequence for displaying the corresponding multi-bit data words and one or more off states on the rows of the second set of rows. The second sequence can begin with the display of on initial off state. The first sequence and the second sequence can begin during a same time interval of the number of time intervals. The controller can be configured to generate control signals and can be coupled to provide the control signals to the frame buffer and the display. The control signals can cause the frame of data and off states to be transferred to the pixels of the display according to the first sequence and the second sequence.

In example systems, the multi-bit data words are binary weighted data words. The duration of the initial off state of the second sequence can equal to 5, 10, 23, 43, 52, 77, or 88 of the time intervals. In an example system defining only two sets of rows, the duration of the initial off state of the second sequence is equal to 5 of the time intervals.

In example display systems, the configuration data can define one or more additional sets of the rows of the display (i.e., in addition to the first two sets). The configuration data can define a total number of the time intervals during which off states are to be asserted in each sequence. The total number of the time intervals can depend on the total number of sets of rows that are defined. The configuration data can also define an additional unique sequence for asserting data and off states on each additional set of rows. Each additional unique sequence can begin with the assertion of off states for a unique initial number of the time intervals and can proceed to the sequential assertion of the bits of the multi-bit data words. Each bit can be asserted for a number of the time intervals corresponding to a significance of the bit being asserted. Each additional unique sequence can end with the assertion of off states for a unique trailing number of the time intervals. For each additional unique sequence a sum of the unique initial number of the time intervals and the unique trailing number of the time intervals is equal to the total number of the time intervals during which off states are to be asserted in each of the sequences.

BRIEF DESCRIPTION OF THE DRAWINGS

The present invention is described with reference to the following drawings, wherein like reference numbers denote substantially similar elements:

FIG. 6 is a table showing pulse width modulation (PWM) write times corresponding to different row groups of a single display;

FIG. 9 is a table associating various offset values, numbers of row groups, bit-depths, and optical efficiency values.

DETAILED DESCRIPTION

The present invention overcomes the problems associated with the prior art, by providing a display having an array of pixels logically separated into at least two groups of pixels and a pixel driver that drives the first group of pixels according to a drive sequence that is temporally offset from the drive sequence of the second group. In the following description, numerous specific details are set forth (e.g., number of pixels in a pixel array, specific display hosting devices, specific display circuitry, specific pixel weighting scheme, etc.) in order to provide a thorough understanding of the invention. Those skilled in the art will recognize, however, that the invention may be practiced apart from these specific details. In other instances, details of well-known display manufacturing practices and components have been omitted, so as not to unnecessarily obscure the present invention.

Figure 1:
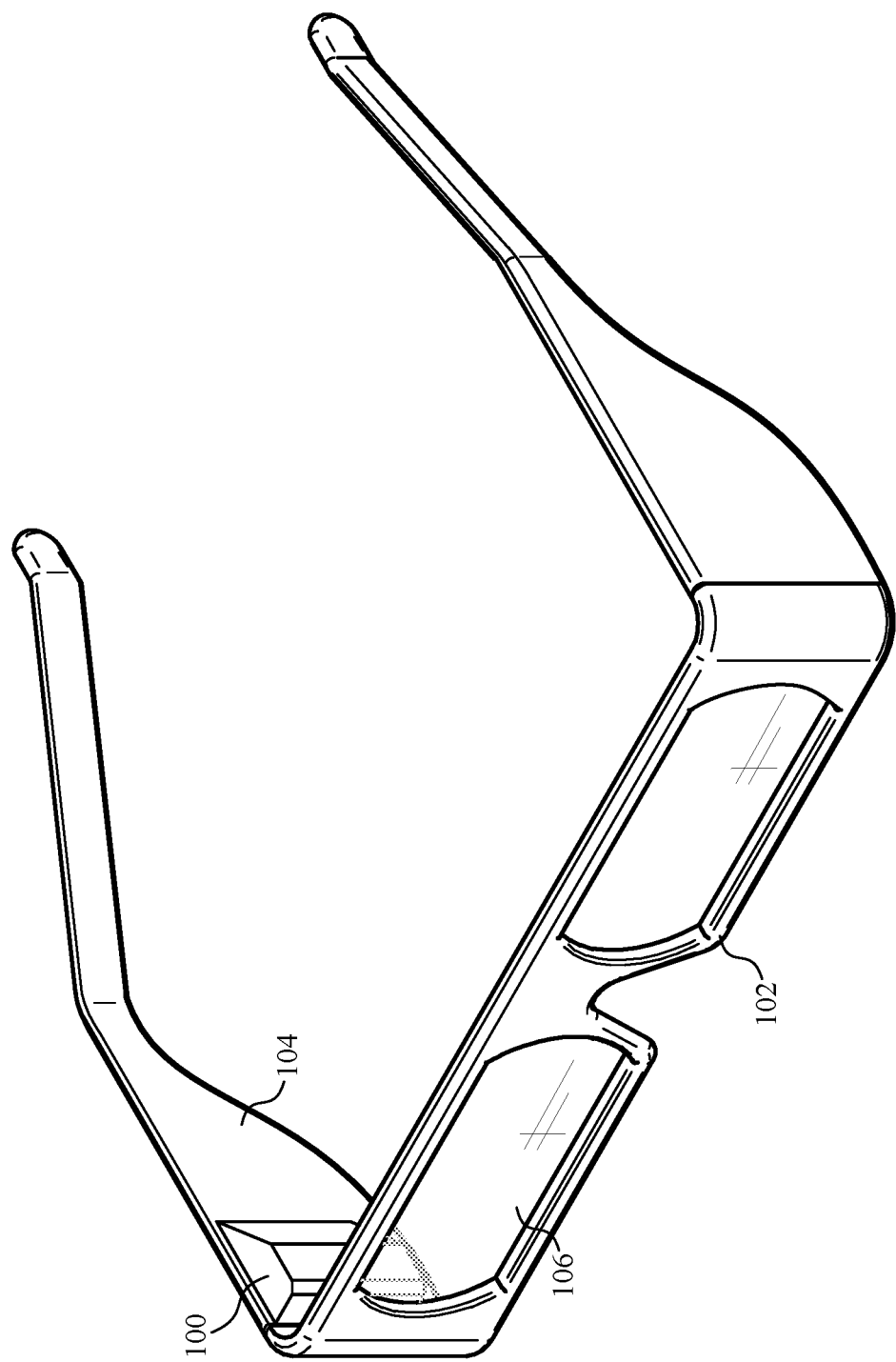
FIG. 1 shows a perspective view of a pair of glasses having an integral digital display system.

FIG. 1 shows a digital display system 100 integrated into a hosting device, which is depicted as a pair of glasses 102. More specifically, display system 100 is incorporated into a projector system that is fixed to the interior of an arm 104 of glasses 102 to project images directly onto a lens 106 of glasses 102. In this example, display system 100 is a micro light emitting diode (µLED) display. Although display system 100 is depicted as a µLED display, the invention may also be used in conjunction with other digital display types such as, for example, liquid crystal displays (LCDs). In addition, glasses 102 are intended to illustrate one example environment. However, the displays and display driving methods disclosed herein can be used in any display environment.

Figure 2:
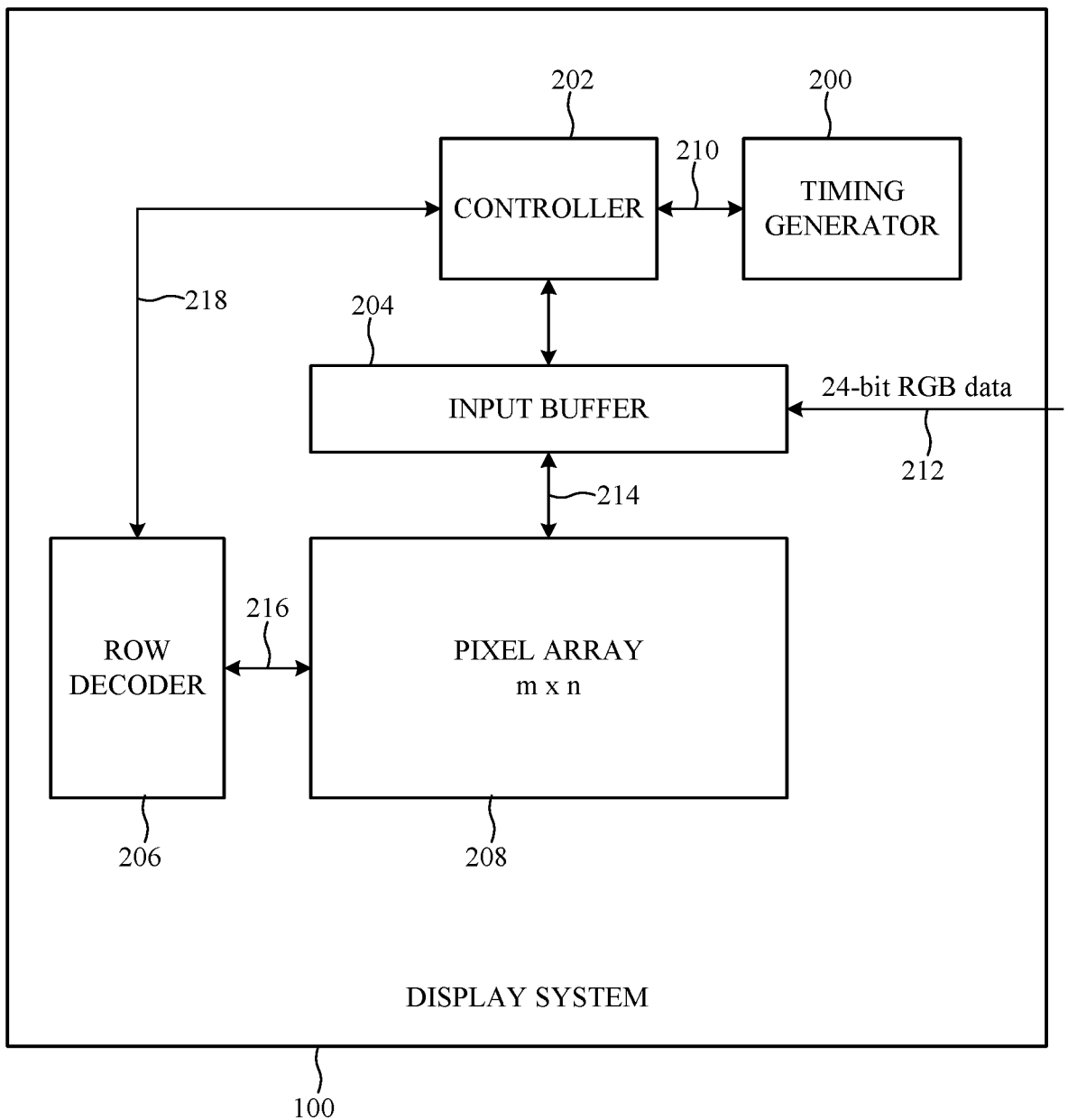
FIG. 2 is a block diagram of the digital display system of FIG. 1.

FIG. 2 is a block diagram showing example components of digital display system 100 in greater detail. Display system 100 includes a timing generator 200, a controller 202, an input buffer 204, a row decoder 206, and a pixel array 208. Timing generator 200 is coupled to controller 202 and is configured to supply timing signals 210 thereto. Controller 202 is coupled to receive the timing signals from timing generator 200, and to provide control signals to input buffer 204, and row decoder 206 to facilitate the coordination and control of the transfer of multi-bit image data to pixel array 208 via input buffer 204. Input buffer 204 is configured to receive 24-bit RGB (Red Green Blue) data 212, reformat the data into bit-planarized data 214, and provide the planarized data to pixel array 208.

In this double-buffered example embodiment, input buffer 204 has the capacity to hold two frames of input data. One frame of input data is the data required to represent a complete image on the screen. That is, one frame of data includes: (number of display rows)×(number of display columns)×(number of colors)×(number of bits per color). For example, for a 1920×1080 display, using 24-bit RGB data (8 bits per color), one frame of data would be 49,766,400 bits (approximately 50 Mb). Because system 100 is a double buffered system, input buffer 204 will have a capacity of two frames, or 99,532,800 bits (approximately 100 Mb). In the double buffered system, one frame of data can be written to half of input buffer 204, while a preceding frame of data is read from a second half of input buffer 204.

Each 24-bits of data includes an 8-bit data word indicative a particular red intensity, an 8-bit data word indicative of a particular green intensity, and an 8-bit data word indicative of a particular blue intensity. In this example, each 8-bit data word is a binary-weighted data word. That is, the individual bit weights (or significances) are as follows: $2^7$, $2^6$, $2^5$, $2^4$, $2^3$, $2^2$, $2^1$, and $2^0$. Therefore, each 8-bit data word is capable of defining 256 different intensity values ranging from 0-255 (128+64+32+16+8+4+2+1). For example, the 8-bit data word (10101001) represents an intensity value of 169 (i.e., 128+0+32+0+8+0+0+1). Value 255 represents the maximum intensity/brightness, and value 0 represents the minimum intensity/brightness. Value 0, which represents the darkest possible pixel, can also be used to place the pixel in an "off state". The assertion of three different intensity values on three different colored LEDs of a pixel result in the appearance of a single pixel of intermediate color and intensity.

Row decoder 206 is coupled between controller and pixel array 208 and is configured to selectively assert row enable signals 216 onto the various pixel rows of pixel array 208 to cause the pixels of the enabled row to load a row of data 214 from input buffer 204 into pixel array 208. More specifically, row decoder 206 receives row address data 218 identifying rows on to which row enable signals 216 are to be asserted. Pixel array 208 is an m×n pixel array, wherein m is the number of columns and n is the number of columns. Pixel array 208 displays video (e.g., a rapid series of images) by asserting the bit-planarized data 214 received and latched from input buffer 204. The details of pixel array 208 will be described in greater detail with reference to FIGS. 3-4.

Figure 3:
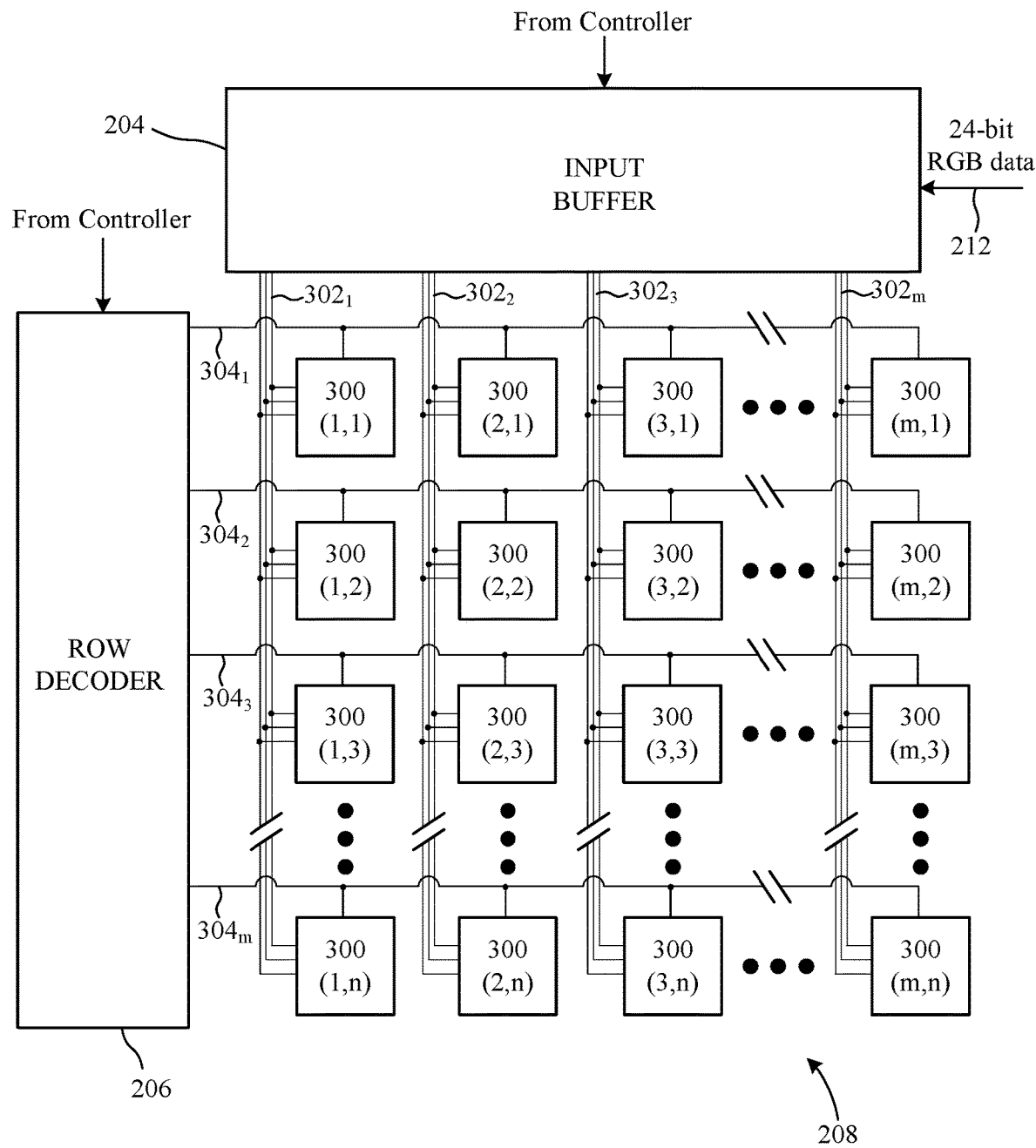
FIG. 3 shows a pixel array of the digital display system of FIG. 2.

FIG. 3 is a diagram showing additional details of pixel array 208, which includes a plurality of pixels 300 arranged into an array of m columns and n rows. Each column of pixels 300 is electrically connected to a respective set of three data lines 302. Each set of data lines 302 includes one line for communicating a data bit of a data word indicative of an intensity value for a particular color from input buffer 204. More specifically, one line of the set is coupled to deliver a bit of the 8-bit data word corresponding to red light intensity, a second line of the set is coupled to deliver a bit of the 8-bit data word corresponding to green light intensity, and the third line of the set is coupled to deliver a bit of the 8-bit data word corresponding to blue light intensity.

Eventually, all 24 bits of the RGB data will be delivered to and displayed by the corresponding pixels. However, as described above, this is accomplished bit-by-bit. For example, during one row load bits $B7_R$, $B7_G$, and $B7_B$ can be delivered, via the set of three data lines 302, to the red, green, and blue LEDs of a pixel. Then, during a subsequent row load, bits $B6_R$, $B6_G$, and $B6_B$ can be delivered, via the set of three data lines 302, to the red, green, and blue LEDs of the same pixel. The process is repeated until all 24 bits of the RGB data are displayed at least once during a frame time.

Each row of pixels 300 is electrically coupled to a respective row enable signal line 304. Responsive to the row decoder 206 asserting an enable signal on a row enable signal line 304, each pixel 300 of that particular row latches data (e.g., a red bit, a green bit, and a blue bit) from a respective set of data lines 302. To load a single frame of data from input buffer 204 to pixels 300, row enable signals are asserted on signal lines 304 in a predetermined order. For example, may start at line $304_1$ and finish on line $304_m$, but the controller can be configured to transfer data to the rows of pixels in any useful order. Each time controller 202 transitions the row enable signal from one row to another, controller 202 also provides control signals to input buffer 204 to coordinate the assertion by input buffer 204 of a different set of data bits on data lines $302_1$-$302_n$.

The following example summarizes the loading of a single frame of pixel data. Initially, row decoder 206 is not asserting an enable signal on any of row enable lines 304. Then, responsive to a row address from controller 202, input buffer asserts bit values corresponding to a particular row of pixels on data lines $302_1$-$302_n$. Then, responsive to a row address and a load signal from controller 202, row decoder asserts a row enable signal on a corresponding one of row enable signal lines (e.g., signal lines $304_1$), thereby latching the data from lines $302_1$-$302_n$ into the respective enabled pixels 300. The row enable signal is asserted by row decoder 206 for a predetermined time and then removed. Next, responsive to a next row address from controller 202, input buffer 204 asserts bit values intended for second row of pixels 300 on data lines $302_1$-$302_n$302. Then, responsive to a corresponding row address and a load signal from controller 202, row decoder 206 asserts a row enable signal on the next row enable signal line (e.g., signal lines $304_2$), thereby latching the new data being asserted on lines $302_1$-$302_n$ into the respective enabled pixels 300 of the second row. The transfer of data bits to the display proceeds sequentially from one row to the next, and repeats, until the entire frame of data (e.g., all bits of every multi-bit data word) and any off states are transferred to the display one or more times. Then, the same process can be used to transfer subsequent frames of data to the display. The relative timing of data bit transfer, row enable signals, and so on will be discussed below in greater detail with reference to several additional figures.

Figure 4:
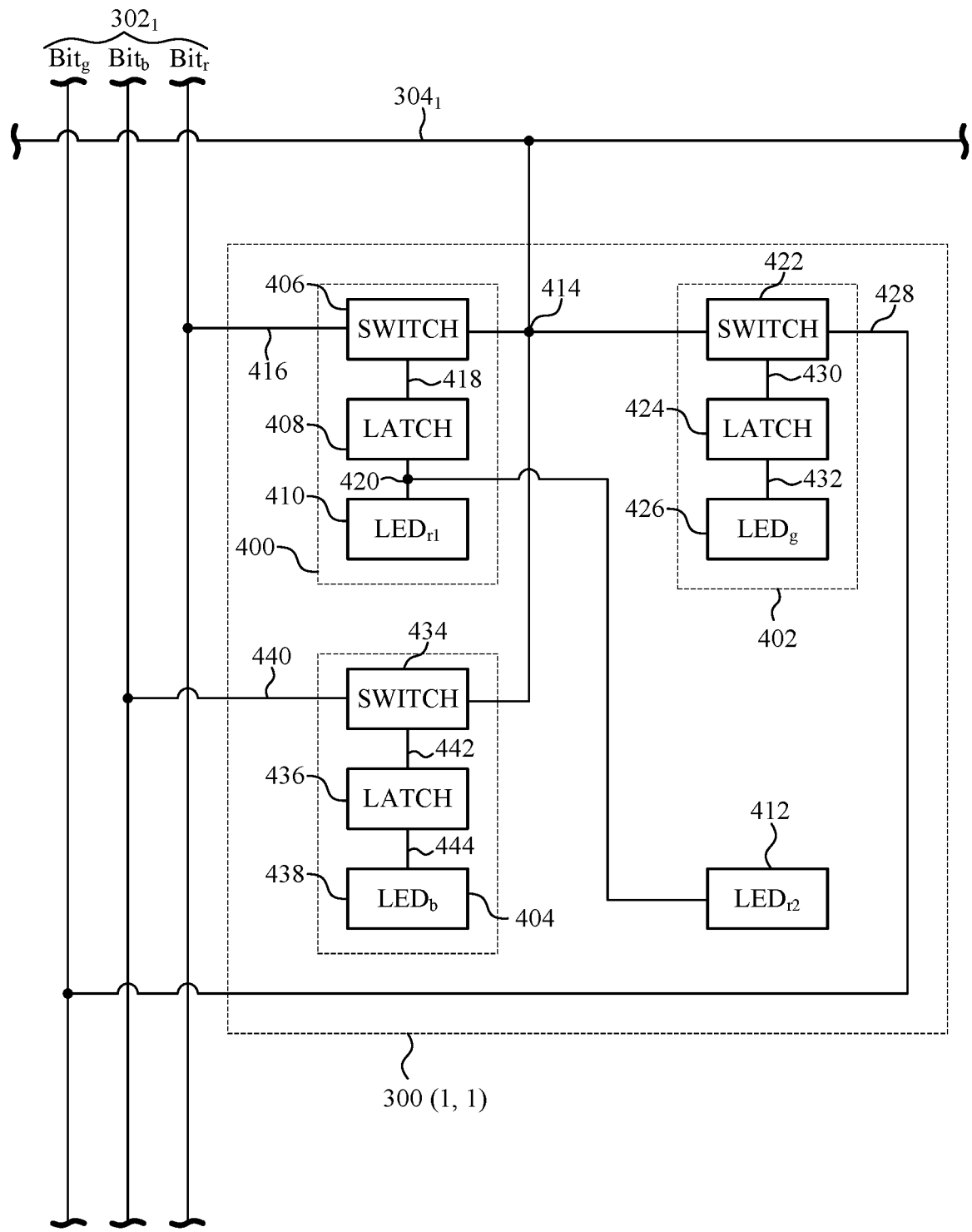
FIG. 4 is a circuit diagram of a pixel of the pixel array of FIG. 3.

FIG. 4 is a block diagram showing additional details of one set of data lines 302, one of row enable signal lines 304, and an example one of multi-color pixels 300. As shown, each set of data lines 302 includes a red bit data line $Bit_R$, a green bit data line $Bit_G$, and a blue bit data line $Bit_B$. Each pixel 300 includes a red light circuit 400, a green light circuit 402, and a blue light circuit 404.

Red light circuit 400 includes a switch 406, a latch 408, a first red μLED 410, and a second red μLED 412. Switch 406 has a control input coupled to row enable signal line 304 at a node 414, a data input coupled to red light intensity data line $Bit_r$ at a node 416, and a data output coupled to an input of latch 408 at a node 418. Latch 408 has an output coupled to inputs of both first μLED 410 and second μLED 412 at a node 420.

Green light circuit 402 includes a switch 422, a latch 424, and a green μLED 426. Switch 422 has a control input that is coupled to row enable signal line 304 at node 414, a data input that is coupled to green light intensity data line $Bit_g$ at a node 428, and an output that is coupled to latch 424 at a node 430. Latch 424 has an output that is coupled to an input of μLED 426 at a node 432.

Blue light circuit 404 includes a switch 434, a latch 436, and a blue μLED 438. Switch 434 has a control input that is coupled to row enable signal line 304 at node 414, a data input that is coupled to blue light intensity data line $Bit_b$ at a node 440, and to latch 436 at a node 442. Latch 436 has an output that is coupled to an input of μLED 438 at a node 444.

The operation of pixel 300 is summarized as follows. First, three data bits of a multi-bit RGB data word are simultaneously asserted on respective data lines 302. Specifically, a first red bit is asserted on data line $Bit_r$, a second green bit is asserted on data line $Bit_g$, and a third blue bit is asserted on data line $Bit_b$. Then, a row enable signal (e.g. digital high) is asserted on row enable signal line 304 and, via node 414, on the control inputs of switches 406, 422, and 434. Responsive to the row enable signal being asserted on their control inputs, each of switches 406, 422, and 434 asserts the bit on its data input onto its output. Thus, actuating switch 406 causes the bit value of $Bit_r$ to get stored into latch 408. Similarly, actuating switch 422 causes the bit value of $Bit_g$ to get stored into latch 424, and actuating switch 434 causes the bit value of $Bit_b$ to get stored into latch 436. When the row enable signal on row enable line $304_1$ is terminated (e.g., goes low), the data bits latched into latches 408, 424, and 436 remain stored until a subsequent row enable signal is asserted on row enable signal line 304 to load the next bits.

The bit value stored in latch 408 is output to node 420, so when the bit value is a digital high, both red μLEDs 410 and 412 illuminate. On the other hand, when the bit value stored in latch 408 and output to μLEDs 410 and 412 is a digital low, both red μLEDs 410 and 412 will be in an off state (e.g., dark). Similarly, the bit value stored in latch 424 is output to node 432, so when the bit value stored in latch 424 is a digital high, green μLED 426 will illuminate. But, if the bit value stored in latch 424 is a digital low, green μLED 426 will be off. The bit value stored in latch 436 is output to node 444, so if the bit value stored in latch 436 is a digital high, blue μLED 438 will illuminate. However, if the bit value stored in latch 436 is a digital low, then blue μLED 438 will be off.

Figure 5:
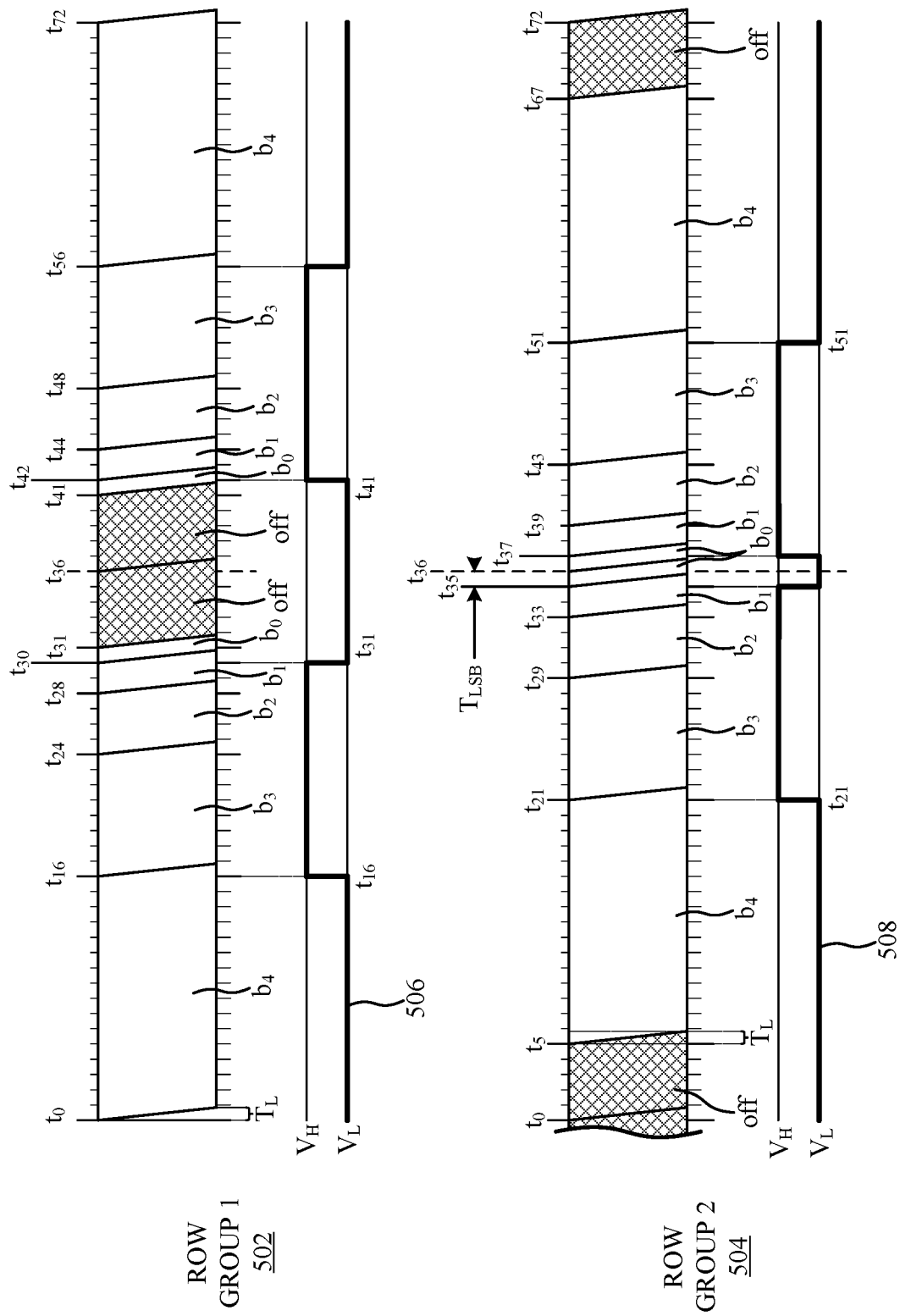
FIG. 5 is a timing diagram of a first row group and a second row group of the pixel array of FIG. 3.

FIG. 5 is a timing diagram 500 for driving pixel array 208 according to an example offset drive scheme. The relative amounts of time that each of the μLEDs 410, 426, and 438 determine the brightness and color displayed by the pixel 300. This offset drive scheme allows a much higher degree of precision to be achieved in terms of displayable pixel light intensity and/or color compared to traditional drive schemes. The offset drive scheme also relaxes the speed requirements of the driving circuitry.

The example drive includes grouping the pixels of pixel array 208 into two or more groups and driving the different groups at different times, even though the different groups share the same data lines. The time offset allows pixel data to be loaded into one group, while the other group is between data update times. The invention is not limited to any number of groups or how the groups are defined. For example, one group can include the top half of pixel rows, while another group includes the remaining bottom half of pixel rows. As another example, the first group may include odd-numbered pixel rows while the second group includes even-numbered pixel rows.

In this example, 24-bit RGB video data is loaded into pixel array 208. Each 24-bits includes an 8-bit data word to define a red intensity level, an 8-bit data word to define a green intensity level, and an 8-bit data word to define a blue intensity level. Together, the three 8-bit data words combine to determine a color and brightness displayed by a pixel.

The example method uses a binary-weighted bit scheme. More specifically, each 8-bit data word ($b_7$, $b_6$, $b_5$, $b_4$, $b_3$, $b_2$, $b_1$, $b_0$) is a binary number that specifies an intensity value. The time during which all of the data corresponding to one display image is asserted (one or more times) on the pixels of the display is called the frame time. The frame time can be divided into a number of coequal time segments, and the significance of each bit of the binary number corresponds to a number of the coequal time segments during which the particular bit will be displayed. In a particular binary weighted scheme, for example: bit $b_0$ has a bit significance of $2^0$ and is displayed for one time segment; bit $b_1$ has a bit significance of $2^1$ and is displayed for two time segments; bit $b_2$ has a bit significance of $2^2$ and is displayed for four time segments; bit $b_3$ has a bit significance of $2^3$ and is displayed for eight time segments, bit $b_4$ has a bit significance of $2^4$ is displayed for sixteen time segments; bit $b_5$ has a bit significance of $2^5$ and is displayed for thirty-two time segments; bit $b_6$ has a bit significance of $2^6$ and is displayed for sixty-four time segments; and bit $b_7$ has a bit significance of $2^7$ and is displayed for one-hundred and twenty-eight time segments. Accordingly, b0 is the least significant bit (LSB) that has an intensity precision of 1/256 of full intensity. In this particular drive scheme, each frame includes 72 time segments.

In some cases, it is desirable to write the same frame of date to the display more than once during a single frame time. For example, in the sequences shown in FIG. 5, each bit is written to the display twice during a single frame time. In addition, as also shown in FIG. 5, the assertion of the bits is arranged to be temporally symmetrical about the center of the time frame. This "center drive" scheme is effective to reduce visual artifacts such as flicker, ghosting, and so on, but requires much faster circuitry, because at least twice as many pixel loads must occur during the frame time. A problem arises when the time period during which the least significant bit (LSB) must be displayed is too short to allow the pixel update/data load of all of the rows of the display. This problem is overcome by dividing the rows of the display into logical segments and loading data into the rows of the segments according to sequences wherein a data load (particularly of the LSB) into the rows of one segment does not coincide with a data load into the rows of another segment.

The following example summarizes one process of loading a single frame of video data into pixel array 208. As previously mentioned, pixel array 208 can driven by 24-bit video data, which includes 8-bit data words for red intensity, 8-bit data words for green intensity, and 8-bit data words for blue intensity. However, the invention is not limited to displays driven by 8-bit data words. Rather, the drive scheme applies to other display systems that use data words having a greater or lesser number of bits. In order to simplify the drawing and explanation of an example process, timing diagram 500 will describe the loading of a frame of 5-bit grayscale data.

As shown in FIG. 5, the rows of the display are logically grouped into a Row Group (1) and a Row Group (2). At time to, the $b_4$ bits begin loading into Row Group (1) 502, row by row, in sequential order starting with pixel row 1 and ending at pixel row 540 (1080/2=540). The loading of bit $b_4$ into the rows of Group (1) is completed before time $t_1$. These $b_4$ bits remain latched for 16 time segments. At the same time $t_0$, digital lows corresponding to the off state of the µLEDs have already been loaded into Row Group 2 504 (loaded during time $t_{67}$ of the previous frame time). Then, at time $t_5$, the $b_4$ bits are loaded into Row Group 2 504, row by row, in sequential order starting with pixel row 541 and ending at pixel row 1080. The loading of the $b^4$ bits into the rows of Group (2) is completed before time $t_6$. These $b_4$ bits remain latched in Row Group 2 504 for 16 time segments.

The time difference between the loading of the $b_4$ bits into the rows of Group (1) 502 and Group (2) 504 can be considered a temporal "offset". In this case, the "offset" is 5 time intervals. Significantly, for binary-weighted data schemes, this offset of five time intervals ensures that a data load of the subsequent bits into the rows of Group (1) 502 will not coincide with a data load of subsequent bits into the rows of Group (2) 504.

Next, at time $t_{16}$, the $b_3$ bits begin sequentially loading into the rows of Group (1) 502 and are displayed for 8 time segments. At time $t_{21}$, the $b_3$ bits begin loading into the rows of Group (2) 504 and are displayed for 8 time segments. Then, at time $t_{24}$, the $b_2$ bits begin loading into the rows of Group (1) 502 and are displayed for 4 time segments. At time $t_{28}$, the $b_1$ bits begin loading into the rows of Group (1) 502 and are displayed for 2 time segments. Next, at time $t_{29}$, the $b_2$ bits begin loading into the rows Group (2) 504 and are displayed for four time segments. At time $t_{30}$, the $b_0$ bits (LSBs) begin loading into the rows of Group (1) 502 and are displayed for 1 time segment (the LSB time). Immediately thereafter, at time $t_{31}$, digital low values corresponding to an off-state begin loading into the rows of Group (2) 502 and are displayed for 10 time segments. At time $t_{33}$, the $b_1$ bits begin loading into the rows of Group (2) 504 and are displayed for 2 time segments. Next, at time $t_{35}$, the $b_0$ bits begin loading into the rows of Group (2) 504 and are displayed for 1 time segment.

Time $t_{36}$ marks the temporal center of the frame time. At this point, the $b_0$-$b_4$ bits (a complete frame of data) have been sequentially displayed, in descending order of significance, by the rows of both Group (1) 502 and Group (2) 504. During the second half of the frame time, all of the $b_0$-$b_4$ bits will be loaded and displayed again, but this time in increasing order of significance. As a result, the data will be displayed temporally symmetrically about the center point of the frame time.

At time $t_{36}$, the $b_0$ bits do not need to be reloaded into the rows of Group (2) 504, because they were already loaded, but are merely displayed for 1 additional time segment. Then, at time $t_{37}$, the $b_1$ bits begin loading into the rows of Group (2) 504 and are displayed for 2 time segments. At time $t_{39}$, the $b_2$ bits begin loading into the rows of Group (2) 504 and are displayed for 4 time segments. Next, at time $t_{41}$, the $b_0$ bits begin loading into the rows of Group (1) 502 and are displayed for 1 time segment. Immediately thereafter, at time $t_{42}$, the $b_1$ bits begin loading into the rows of Group (1) 502 and are displayed for 2 time segments. Then, at time $t_{43}$, the $b_3$ bits begin loading into the rows of Group (2) 504 and are displayed for 8 time segments. At time $t_{44}$, the $b_2$ bits begin loading into the rows of Group (1) 502 and are displayed for 4 time segments. Next, at time $t_{48}$, the $b_3$ bits begin loading into the rows of Group (1) 502 and are displayed for 8 time segments. At time $t_{51}$, the $b_4$ bits begin loading into the rows of Group (2) 504 and are held for 16 time segments. Then, at time $t_{56}$, the $b_4$ bits begin loading into the rows of Group (1) 502 and are displayed for 16 time segments. At time $t_{67}$, digital low values (off states) begin loading into the rows of Group 504 and are displayed for 10 time segments, which carry over and end at time $t_5$ of the following frame when bit $b_4$ of the following frame is loaded into the rows of Group (2) 504. As explained above, and is visible in FIG. 5, there is no temporal overlap between the data loads of Row Group (1) 502 and Row Group (2) 504.

In this example, off states (e.g., a dark pixel) is achieved by loading a digital low into the pixel. However, other types of displays can have different means of turning a pixel "off". The processes and driving methods disclosed herein are compatible with and can be used in conjunction with any such different displays.

In the view of FIG. 5, the leading edge of each bit time duration is angled downward to represent the finite load time $T_L$ it takes to sequentially load new data into all of the pixel rows of the corresponding row group. As shown, the load time $T_L$ is slightly less than the duration of one time segment or, in other words, slightly less than the LSB time $T_{LSB}$. If the timing sequence for Row Group (2) 504 wasn't delayed/offset from the timing sequence of row group 504, the LSB time duration $T_{LSB}$ would have to be substantially longer, because the rows of Group (1) 502 and Group (2) 504 could not both be loaded during a single LSB time interval.

For example, consider time t30, where the LSB is loaded into the rows of Group (1) 502. If the rows of Group (2) 504 were also loaded during t30 (immediately following the loading of Group (1) 502, the loading of Group (2) 504 would not be completed by time t31. By the time the loading of rows of Group (2) 504 was completed, the LSB would have already been displayed by the rows of Group (1) 502 for too long.

FIG. 5 also shows a first digital signal 506 and a second digital signal 508, which represent an example same data word (same intensity value) being displayed by a pixel of a row of Group (1) 502 and a pixel of a row of Group (2) 504, respectively, but at the offset times. In this example, the data word is 01110, wherein $b_4$ is a digital 0, $b_3$ is 1, $b_2$ is 1, $b_1$ is 1, and $b_0$ is 0. The intensity value of the example data word is 14. The five-bit data word corresponds to 32 of the time intervals, and the offset is five time intervals. Therefore, because the five-bit data word and the off states are displayed twice in the frame time, the frame time is divided into 72 coequal time intervals.

Although signals 506 and 508 may appear different, the resulting intensity of both are the same. Because the data word and off states are displayed twice in the frame time, the voltage is high ($V_H$) (pixel on) for a total of 28 time segments (2×14) out of the 72 time segments, and the voltage is low ($V_L$) (pixel off) for the other 44 time segments, 10 of which are off states. The human eye will integrate the on states, and so the intensity (01110) will appear the same, regardless of which group of rows displays the value.

The same number of off states should be introduced into the driving sequence of each group of rows. If additional logical groups of rows are defined, more off states will be used to offset the driving sequences of those additional groups. However, every group of rows will use the same number of off states as the row group requiring the greatest offset. As will be explained below, those off states will be distributed differently within the driving sequences of the respective rows.

The introduction of the off states to accommodate the offset between groups of rows results in a loss in optical efficiency. For example, because the off states corresponding to the offset occupy a total of 10 time segments (5 in the first half of the frame time and 5 in the second half of the frame time), the maximum possible intensity represented by the data word 11111 would result in an on state for 62 (2×31) time segments out of 72 time segments. To accommodate for this loss $$\left(\frac{72-62}{72} = 0.139\%\right)$$

in optical efficiency, the electrical current supplied to the μLEDs may be increased. The optical efficiency for different length data words will be discussed in further detail with reference to upcoming FIG. 7.

In choosing the number of time segments to offset the loading of Row Group (2) 504 from the loading of Row Group (1) 502, certain unique offset numbers will prevent the time intervals during which bits are loaded into Row Group (1) 502 from coinciding with the time intervals during which bits are loaded into Row Group (2) 504. For example, by offsetting row group 504 from row group 502 by 5 time segments, the times at which new data is loaded into the rows of Group (1) 502 (i.e., $t_0$, $t_{16}$, $t_{24}$, $t_{28}$, $t_{30}$, $t_{31}$, $t_{41}$, $t_{42}$, $t_{44}$, $t_{48}$, and $t_{56}$) do not overlap or coincide with the times at which new data is loaded into the rows of Group (2) 504 (i.e., $t_5$, $t_{21}$, $t_{29}$, $t_{33}$, $t_{35}$, $t_{36}$, $t_{37}$, $t_{39}$, $t_{43}$, $t_{51}$, and $t_{67}$). On the other hand, if row group 504 is offset from row group 502 by a number of time segments other than these unique numbers, the time intervals during which new data is loaded into the rows of Group (1) 502 will overlap with the time intervals during which new data is loaded into the rows of Group (2) 504 at least once. As previously mentioned, it is desirable that these times should not overlap due to the limitations of the LSB time.

Note also that the data bits can be loaded into each segment in the same order (e.g., $b_4$, $b_3$, $b_2$, $b_1$, $b_0$, $b_0$, $b_1$, $b_2$, $b_3$, $b_4$). In prior art systems, more complicated arrangements of bit order were used to try to accommodate shorter LSB times.

FIG. 6 is a table 600 which compares the times at which a binary pulse-width-modulation (PWM) sequence of bits are loaded with no offset to the times at which binary PWM sequences of bits are loaded with various offset values. As shown, no overlap occurs when the offset values are 0, 5, 10, 23, 43, 52, 77, and 88. Table 600 also shows the offset values that are used for different numbers of pixel groups. For example, four logical pixel row groups are defined for a display, the first pixel row group will have no offset, the second pixel row group can be offset by five time segments, the third pixel row group can be offset by ten time segments, and the fourth pixel row group can be offset by twenty three time segments.

The Row Group #identifies a logical group of rows, but does not necessarily dictate a sequence or number of row groups that are defined. For example, the rows of a display could be divided into three groups, with group 1 having no offset, group 2 having an offset of 10, and group 3 having an offset of 52. In this case there would be no overlap in the updating of the rows of the groups. However, as will be explained below, there would be an unnecessarily large loss in optical efficiency. For efficiency sake, once the number of row groups is determined, using the row groups with the least amount of offset is preferred.

Figure 7:
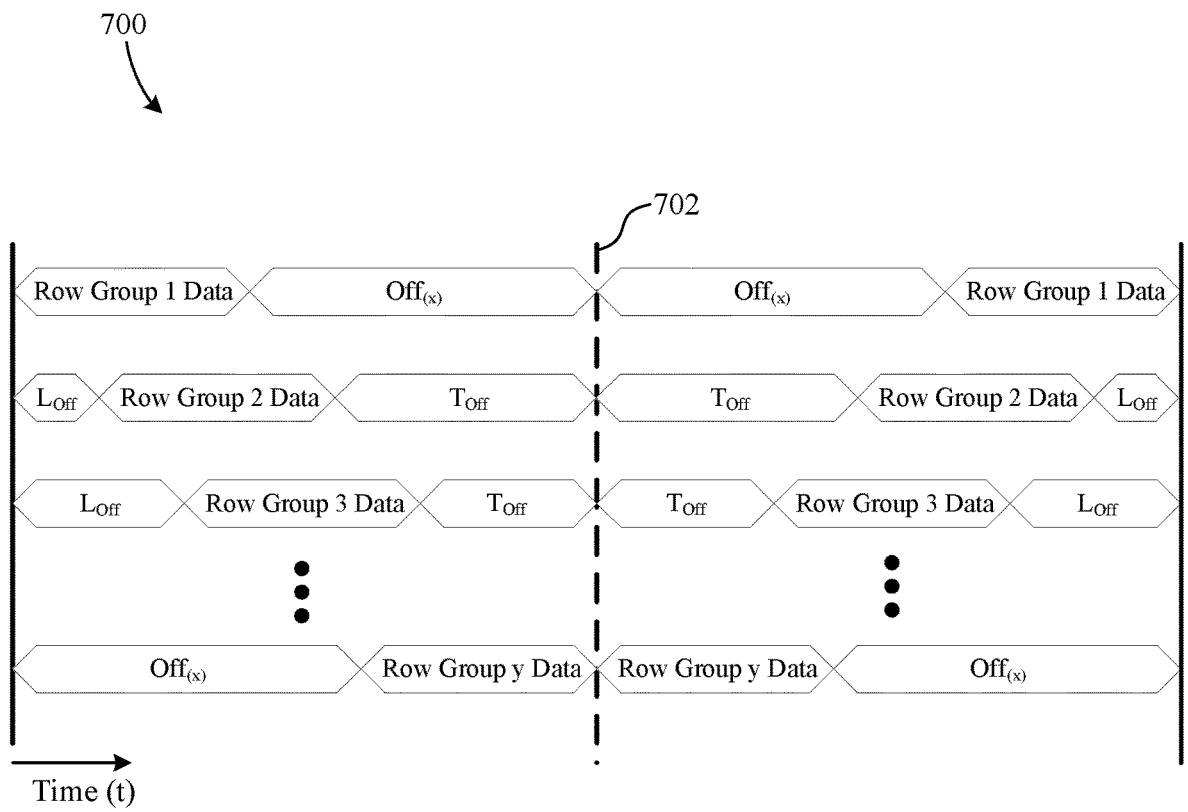
FIG. 7 is a timing diagram for driving the pixel array of FIG. 3.

FIG. 7 is an example timing diagram 700 summarizing the writing of a frame of data to a display using a plurality of logically defined pixel row groups. Initially, at time $t_0$, data for Row Group 1 begins to be displayed. Once data from pixel row group 1 is complete, off states are displayed by the pixels of Row Group 1 for a total number (x) off states. As used here, the number off states means the number of time intervals during which a pixel is off.

The total number of off states (for each half of the frametime) is determined based on the number logical row groups that are defined. In particular, the total number of off states is selected to be equal to the offset of the row having the greatest offset. So, according to table 600 of FIG. 6, if two row groups are defined, then the total number of off states will be 5. If 4 row groups are defined, then the total number of off states will be 23. If 7 row groups are defined, then the total number of off states will be 77, and so on.

After the halfway point 702 of the frame time, the pixels of Row Group 1 display the same number of off states, and then again display the data for Row Group 1. In this second display of the data for Row Group 1, the data will be rearranged so as to maintain temporal symmetry about the halfway point 702. For example, in the first half of the frame time, the data bits can be displayed in order of decreasing significance. Then, in the second half of the frame time, the data bits can be displayed in order of increasing significance.

The sequence for Row Group 2 begins with a number of leading off states ($L_{off}$) corresponding to the desired offset for Row Group 2. Because Row Group 2 is the second defined group of rows, then according to table 600 of FIG. 6 the number of leading off states for Row Group 2 is 5. After data for Row Group 2 is displayed, the pixels of Row Group 2 display a number of trailing off states $T_{off}$ (i.e., an off state for $T_{off}$ time segments). For Row Group 2, $T_{off}$=x−$L_{off}$=x−5. As indicated above, m depends on the total number of pixel row groups for a given display. For example, if there are four pixel row groups, x=23, which would also be the number of off states per pixel row group. If x=23, then $T_{off}$ for pixel row group 2 would be $T_{off}$=x−$L_{off}$=23−5=18. Accordingly, $T_{off}$ for pixel row group 3 would be $T_{off}$=x−$P_{off}$=23−10=13.

The sequence for Row Group 3 begins with the display of a number of leading off states, proceeds to the display of the pixel data, which is followed by the display of a number of trailing off states. For Row Group 3, according to table 600, the number leading off states is 10. Therefore, if the total number of off states x=23, then the number of trailing off states will be 13 (23−10).

The sequence for Row Group (y) begins with the display of the maximum number of leading off states (x). The display of the x leading off states is followed by the display of the pixel data, which ends at the halfway point 702 of the frame time. The sequence for Row Group (y) does not include any trailing off states.

For each Row Group 1-y, the display sequence for the second half of the frame time is the reverse of the display sequence for the first half of the frame time. As indicated above, using the reverse sequence in the second half of the frame time maintains temporal symmetry about the halfway point 702. Also, the sequence for each row group includes the same number of off states.

Figure 8:
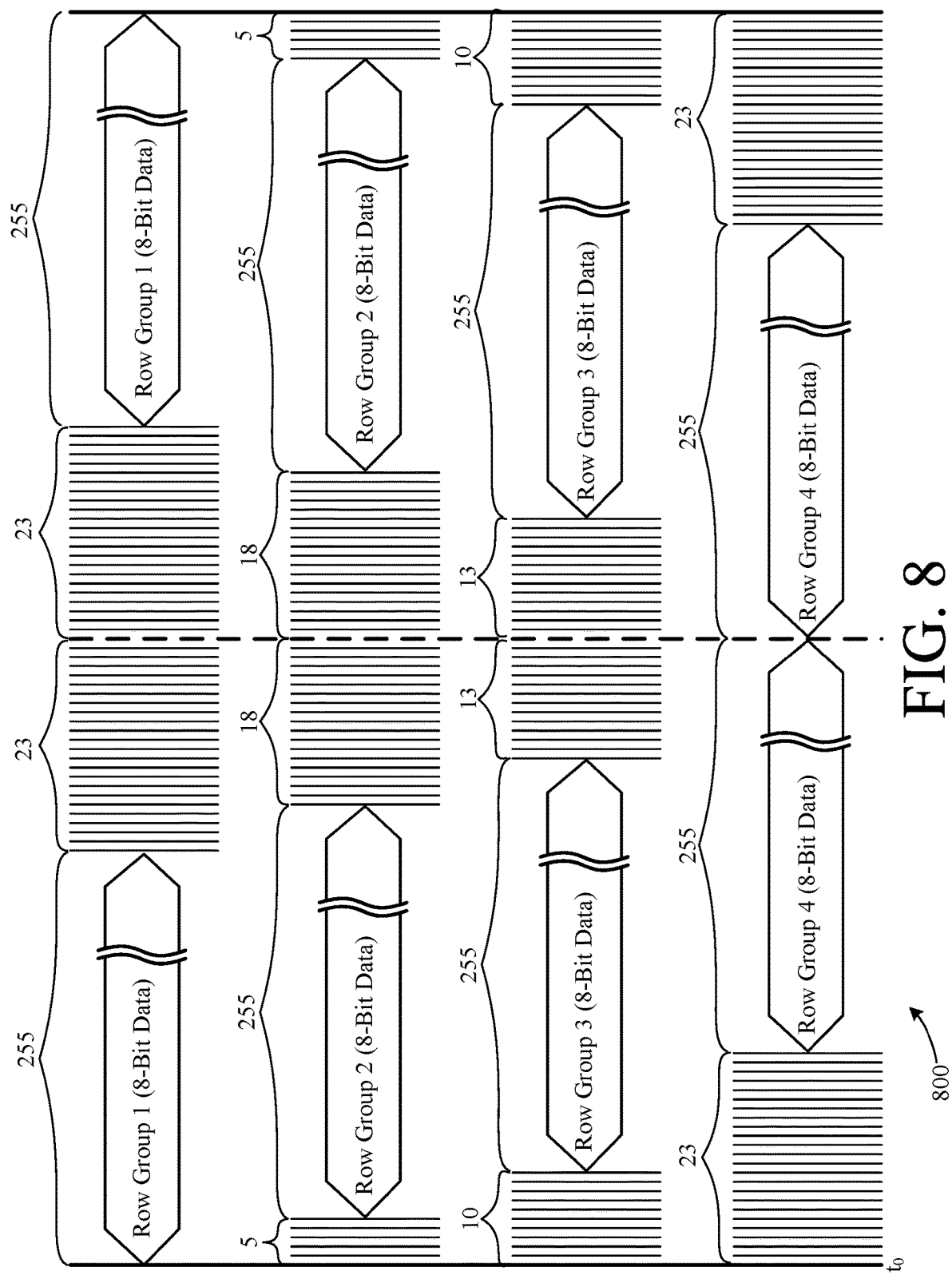
FIG. 8 is a timing diagram for driving the pixel array of FIG. 3 with four different predefined row groups.

FIG. 8 shows a timing diagram 800 of a particular example drive sequence for an 8-bit system. In this particular example, 4 logical groups of rows are defined. From table 600 of FIG. 6, the offset for Group 1 is 0, the offset for Group 2 is 5, the offset for Group 3 is 10, and the offset for Group 4 is 23. Because Group 4 has the greatest offset, the total number of off states for each row will be 23.

The sequence for Row Group 1 is initiated at time $t_0$ with the display of the pixel data, which continues for 255 time segments and is followed by 23 off states up to the halfway point of the frame time. Then, in the second half of the frame time, the same sequence for Row Group 1 is displayed in reverse order. The sequence for row Group 2 begins at time $t_0$ with the display of an off state, which continues for 5 time segments, then proceeds to the display of the pixel data for Row Group 2, which takes 255 time segments, and then displays off states again for 18 (23−5) time segments, up to the halfway point of the frame time. Then, in the second half of the frame time, the same sequence for Row Group 2 is displayed in reverse order. The sequence for Row Group 3 begins at time $t_0$ with the display of off states, which continues for 10 time segments. Then the pixel data for Row Group 3 is displayed over the next 255 time segments. After the display of the pixel data, off states are displayed again for 13 (23−10) time segments up to the halfway point of the frame time. Then, in the second half of the frame time, the same sequence for Row Group 3 is displayed in reverse order. Finally, for Row Group 4, off states are initiated at time $t_0$ and continue for 23 time segments. Then, the pixel data for Row Group 4 is displayed over the next 255 time segments, up to the halfway point of the frame time. Then, in the second half of the frame time, the same sequence for Row Group 4 is displayed in reverse order.

FIG. 9 is a table 900 associating offset values, group numbers, and optical efficiencies of 8-bit and 10-bit display systems. When offset or "off" values are used in a drive scheme, there is an inevitable efficiency loss. For example, if a single display has only one pixel group, no offset is used and, therefore, no efficiency is lost. On the other hand, if the display has multiple pixel row groups with offsets, the off states cause a slight drop in optical efficiency, because there are some time segments that are always off. The efficiency is calculated as the maximum number of time segments capable of being "on" divided by the overall number of time segments. For example, in an 8-bit system with three pixel row groups, there is a total of 255 time segments of data and 10 time segments that are always off. Out of the total number of time segments 265 (255+10), only 255 can be illuminated. Therefore, the efficiency is 255/265=96.23%. To accommodate this efficiency drop, the inventors have found that increasing the electrical current in the diode achieves acceptable illumination intensity gain.

Table 900 is useful in determining a good compromise between the number of row groups to use and efficiency. The greater the number of row groups, the greater bit depth, color precision, and intensity precision. However, the increased number of row groups comes at the cost of efficiency. The inventor has discovered that an efficiency of around 95% is acceptable, at least in part because the output of the μLEDs can be increased slightly by increasing the electrical current through the μLEDs. Therefore, for a 10-bit system, 5 or 6 logical row groups is a good compromise. On the other hand, for an 8-bit system, 3 logical row groups is a good compromise.

Figure 10:
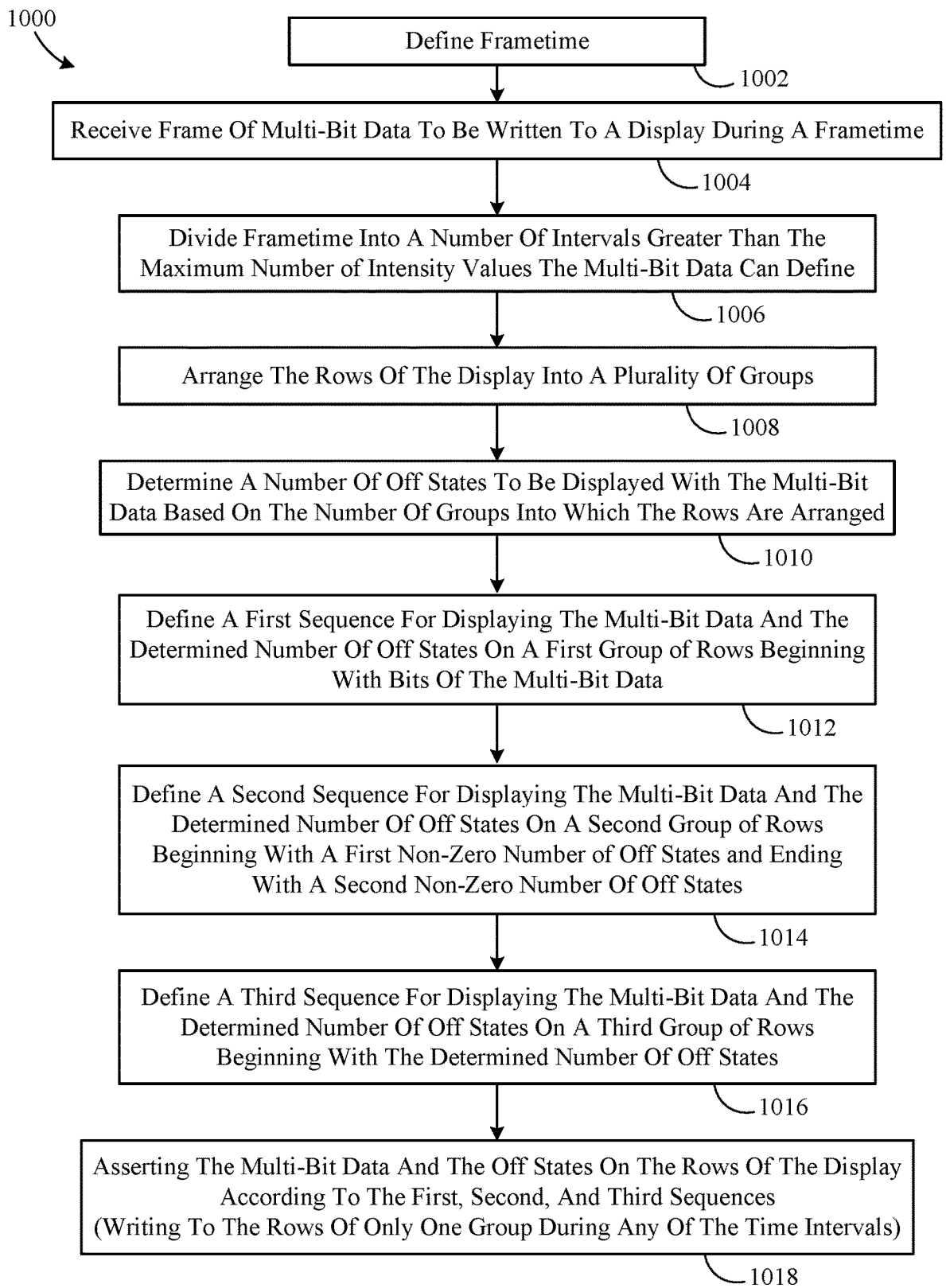
FIG. 10 is a flowchart summarizing an example method of driving a pixel array.

FIG. 10 is a flowchart 1000 summarizing a method for driving a digital display. In a first step 1002, a frametime is defined. In a second step 1004, a frame of multi-bit data is received, which is to be written to the display during the frametime. Then, in a third step 1006, the frametime is divided into a number of coequal intervals, the number of coequal intervals being greater than the number of different intensity values that the multi-bit data can define. Next, in a fourth step 1008, the rows of the display are arranged/organized into a plurality of groups. Then, in a fifth step 1010, a number of off states (time intervals during which the pixels are dark) to be displayed with the multi-bit data during the frametime is determined. The number of off states is determined based on the number of groups into which the rows are arranged. Next, in a sixth step 1012, a first sequence for displaying the multi-bit data and the determined number of off states on a first group of the rows is defined. The first sequence begins with the assertion of bits of the multi-bit data. Then, in a seventh step 1014, a second sequence for displaying the multi-bit data and the determined number of off states on a second group of the rows is defined. The second sequence begins with the assertion of a first non-zero number of off states (i.e., the assertion of an off state for the first non-zero number of the time intervals) and ends with a second non-zero number of off states. Next, in an eighth step 1016, a third sequence for displaying the multi-bit data and the determined number of off states on a third group of the rows is defined. The third sequence begins with the number of off states determined in fifth step 1010. In a ninth step 1018, the multi-bit data and the off states are asserted on the pixels of the display according to the first, second, and third sequences. The sequences are defined such that data is written to the rows of no more than a single one of the groups of rows during every time interval of the frametime.

The description of particular embodiments of the present invention is now complete. Many of the described features may be substituted, altered or omitted without departing from the scope of the invention. For example, alternate types of digital displays (e.g. liquid crystal displays, monochromatic displays, and so on), may be substituted for the μLED display. As another example, the pixel array may include different circuitry for loading data bits and/or off states. As yet another example, although the example embodiments included multi-color pixels, the methods described herein are also advantageous in grayscale displays. As yet another example, in the illustrated drive schemes the multibit data words are each written twice during a frame time (symmetrically about a temporal center of the frame time). However, the data words can be written only once during each frame time, as long as the loading of each segment does not coincide with the loading of another segment. These and other deviations from the particular embodiments shown will be apparent to those skilled in the art, particularly in view of the foregoing disclosure.

I claim:

1. A method for driving a digital display including a plurality of pixels arranged in a plurality of rows, said method comprising:
receiving a frame of data, said frame of data to be written to said digital display during a predefined frame time, said frame of data including one multi-bit data word corresponding to each pixel of said display, each multi-bit data word including a plurality of individual bits, each bit having a weight corresponding to an amount of time that said bit should be displayed by said corresponding pixel, each multi-bit data word capable of defining a maximum number of different intensity values;
dividing said frame time into a total number of time intervals, said total number of time intervals being greater than said maximum number of different intensity values;
defining a first set of said rows of said display;
defining a second set of said rows of said display;
defining a first sequence for displaying said corresponding multi-bit data words and one or more off states by said rows of said first set of rows, said first sequence beginning with the display of bits of said multi-bit data words;
defining a second sequence for displaying said corresponding multi-bit data words and one or more off states on said rows of said second set of rows, said second sequence beginning with the display of an initial off state, said first sequence and said second sequence beginning during a same time interval of said number of time intervals; and
displaying said frame of data and said off states on said display according to said first sequence and said second sequence; and wherein
the number of time intervals during which off states are asserted on the pixels of said first set of rows during said first sequence is the same as the number of time intervals during which off states are asserted on the pixels of said second set of rows during said second sequence.

2. The method of claim 1, wherein:
said multi-bit data words are binary weighted data words; and
a duration of said initial off state of said second sequence is equal to 5, 10, 23, 43, 52, 77, or 88 of said time intervals.

3. The method of claim 2, wherein said duration of said initial off state of said second sequence is equal to 5 of said time intervals.

4. The method of claim 1, wherein:
said first sequence includes loading data into said pixels of said first set of rows during a first set of said time intervals;
said second sequence includes loading data into said pixels of said second set of rows during a second set of said time intervals; and
said first set of said time intervals and said second set of said time intervals are mutually exclusive.

5. The method of claim 1, wherein:
said first sequence includes sequentially loading said data bits of said multi-bit data words into said pixels in descending order of bit significance, loading an off state into said pixels, and then reloading said bits of said multi-bit data words into said pixels in ascending order of bit significance; and
said second sequence includes sequentially loading a first off state into said pixels, loading said data bits of said multi-bit data words into said pixels in descending order of bit significance, reloading said bits of said multi-bit data words into said pixels in ascending order of bit significance, and then loading a second off state into said pixels.

6. The method of claim 5, wherein the duration of said off state in said first sequence is equal to a sum of the durations of said first off state and said second off state of said second sequence.

7. The method of claim 1, wherein:
said first sequence includes a first bit that is displayed for a first time period;
said second sequence includes a second bit that is displayed during at least a part of said first time period; and
said second sequence includes a third bit that is displayed during at least a part of said first time period.

8. The method of claim 7, wherein said second sequence includes a fourth bit that is displayed during at least a part of said first time period.

9. The method of claim 8, wherein:
said third bit is displayed for a second time period;
said second time period starts after said first time period begins; and
said second time period ends before said first time period ends.

10. The method of claim 1, further comprising:
defining one or more additional sets of said rows of said display;
asserting off states on the pixels of the rows of each set of rows for the same number of said time intervals; and
determining said same number of time intervals based on a total number of sets of rows that are defined.

11. The method of claim 10, wherein:
exactly three sets of rows are defined, and the same number of time intervals during which off states are asserted is ten;
exactly four sets of rows are defined, and the same number of time intervals during which off states are asserted is twenty-three;
exactly five sets of rows are defined, and the same number of time intervals during which off states are asserted is forty-three;
exactly six sets of rows are defined, and the same number of time intervals during which off states are asserted is fifty-two;
exactly seven sets of rows are defined, and the same number of time intervals during which off states are asserted is seventy-seven; or
exactly eight sets of rows are defined, and the same number of time intervals during which off states are asserted is eighty-eight.

12. The method of claim 1, further comprising:
defining an additional plurality of sets of rows; and wherein
during every one of said time intervals, data is written to no more than one set of rows.

13. A method for displaying data on a display including a plurality of pixels arranged in a plurality of rows, said method comprising:
receiving a frame of data to be written to said display during a predefined frame time, said frame of data including one multi-bit data word corresponding to each pixel of said display, each multi-bit data word including a plurality of individual bits, each bit having a weight corresponding to an amount of time that said bit should be displayed by said corresponding pixel, each multi-bit data word being capable of defining a maximum number of different intensity values;
dividing said frame time into a total number of time intervals, said total number of time intervals being greater than said maximum number of intensity values;
defining a plurality of groups of said rows; and
defining a different update sequence for each group of said plurality of groups of said rows, each of said update sequences defining the particular ones of said time intervals during which said pixels of said rows of an associated group will be updated with bits of said multi-bit data words and other ones of said time intervals during which said pixels of said rows of said associated group will be updated with off states; and
displaying said frame of data and said off states on said display according to said different update sequences; and wherein
during each particular one of said time intervals, the pixels of no more than one group of rows will be updated.

14. The method of claim 13, wherein:
a first update sequence associated with a first group of said rows begins with the sequential assertion of said bits of said multi-bit data words, each bit being asserted for a number of said time intervals corresponding to a significance of said bit being asserted, and ends with the assertion of off states for a predetermined number of said time intervals, said predetermined number of said time intervals depending on the number of groups in said plurality of groups;
a second update sequence associated with a second group of said rows begins with the assertion of off states for said predetermined number of said time intervals and ends with the sequential assertion of said bits of said multi-bit data words, each bit being asserted for a number of said time intervals corresponding to a significance of said bit being asserted; and
a third update sequence associated with a third group of said rows begins with the assertion of off states for an initial number of said time intervals, proceeds to the sequential assertion of said bits of said multi-bit data words, each bit being asserted for a number of said time intervals corresponding to a significance of said bit being asserted, and ends with the assertion of off states for a trailing number of said time intervals, a sum of said initial number of said off states and said trailing number of said off states is equal to said predetermined number of said off states.

15. The method of claim 14, wherein:
an additional plurality of update sequences associated, respectively, with an additional plurality of groups of rows, each begins with the assertion of off states for a unique initial number of said time intervals, proceeds to the sequential assertion of said bits of said multi-bit data words, each bit being asserted for a number of said time intervals corresponding to a significance of said bit being asserted, and ends with the assertion of off states for a unique trailing number of said time intervals; and
for each update sequence of said additional plurality of update sequences a sum of said unique initial number of said time intervals and said unique trailing number of said time intervals is equal to said predetermined number of said off states.

16. A display system including:
a display including a plurality of pixels arranged in a plurality of rows;
a frame buffer operative to receive a frame of data and to provide said data to said pixels of display responsive to control signals, said frame of data including one multi-bit data word corresponding to each pixel of said display, each multi-bit data word including a plurality of individual bits, each bit having a weight corresponding to an amount of time that said bit should be displayed by said corresponding pixel, each multi-bit data word capable of defining a maximum number of different intensity values;

configuration data defining said frame time as a total number of time intervals, said total number of time intervals being greater than said maximum number of different intensity values, defining a first set of said rows of said display, defining a second set of said rows of said display, defining a first sequence for displaying said corresponding multi-bit data words and one or more off states by said rows of said first set of rows, said first sequence beginning with the display of bits of said multi-bit data words, and defining a second sequence for displaying said corresponding multi-bit data words and one or more off states on said rows of said second set of rows, said second sequence beginning with the display of on initial off state, said first sequence and said second sequence beginning during a same time interval of said number of time intervals; and a controller configured to generate control signals and coupled to provide said control signals to said frame buffer and said display, said control signals causing said frame of data and off states to be transferred to said pixels of said display according to said first sequence and said second sequence; and wherein said configuration data defines one or more additional sets of said rows of said display;

said configuration data defines a total number of said time intervals during which off states are to be asserted in each sequence, said total number of said time intervals depending on a total number of sets of rows;

said configuration data defines an additional unique sequence for asserting data and off states on each additional set of rows, each additional unique sequence beginning with the assertion of off states for a unique initial number of said time intervals, proceeding to the sequential assertion of said bits of said multi-bit data words, each bit being asserted for a number of said time intervals corresponding to a significance of said bit being asserted, and ending with the assertion of off states for a unique trailing number of said time intervals; and for each additional unique sequence a sum of said unique initial number of said time intervals and said unique trailing number of said time intervals is equal to said total number of said time intervals during which off states are to be asserted in each sequence.

17. The display system of claim 16, wherein:

said multi-bit data words are binary weighted data words; and a duration of said initial off state of said second sequence is equal to 5, 10, 23, 43, 52, 77, or 88 of said time intervals.

18. The display system of claim 17, wherein said duration of said initial off state of said second sequence is equal to 5 of said time intervals.

19. A method for driving a digital display including a plurality of pixels arranged in a plurality of rows, said method comprising:

receiving a frame of data, said frame of data to be written to said digital display during a predefined frame time, said frame of data including one multi-bit data word corresponding to each pixel of said display, each multi-bit data word including a plurality of individual bits, each bit having a weight corresponding to an amount of time that said bit should be displayed by said corresponding pixel, each multi-bit data word capable of defining a maximum number of different intensity values;

dividing said frame time into a total number of time intervals, said total number of time intervals being greater than said maximum number of different intensity values;

defining a first set of said rows of said display;

defining a second set of said rows of said display;

defining a first sequence for displaying said corresponding multi-bit data words and one or more off states by said rows of said first set of rows, said first sequence beginning with the display of bits of said multi-bit data words;

defining a second sequence for displaying said corresponding multi-bit data words and one or more off states on said rows of said second set of rows, said second sequence beginning with the display of an initial off state, said first sequence and said second sequence beginning during a same time interval of said number of time intervals; and displaying said frame of data and said off states on said display according to said first sequence and said second sequence; and wherein said first sequence includes a first bit that is displayed for a first time period;

said second sequence includes a second bit that is displayed during at least a part of said first time period; and said second sequence includes a third bit that is displayed during at least a part of said first time period.

20. A method for driving a digital display including a plurality of pixels arranged in a plurality of rows, said method comprising:

receiving a frame of data, said frame of data to be written to said digital display during a predefined frame time, said frame of data including one multi-bit data word corresponding to each pixel of said display, each multi-bit data word including a plurality of individual bits, each bit having a weight corresponding to an amount of time that said bit should be displayed by said corresponding pixel, each multi-bit data word capable of defining a maximum number of different intensity values;

dividing said frame time into a total number of time intervals, said total number of time intervals being greater than said maximum number of different intensity values;

defining a first set of said rows of said display;

defining a second set of said rows of said display;

defining one or more additional sets of said rows of said display;

defining a first sequence for displaying said corresponding multi-bit data words and one or more off states by said rows of said first set of rows, said first sequence beginning with the display of bits of said multi-bit data words;

defining a second sequence for displaying said corresponding multi-bit data words and one or more off states on said rows of said second set of rows, said second sequence beginning with the display of an initial off state, said first sequence and said second sequence beginning during a same time interval of said number of time intervals;

defining one or more additional sequences for displaying said corresponding multi-bit data words and one or more off states on said rows of said one or more additional set of rows;

determining a same number of time intervals based on a total number of sets of rows that are defined; and displaying said frame of data and said off states on said display according to said first sequence, said second sequence, and said one or more additional sequences, by asserting said off states on the pixels of the rows of each said set of rows for said same number of said time intervals.

\* \* \* \* \*